US008203738B2

(12) United States Patent
Hibino et al.

(10) Patent No.: US 8,203,738 B2
(45) Date of Patent: Jun. 19, 2012

(54) IMAGE FORMING DEVICE, IMAGE FORMING DEVICE TERMINAL, AND PROGRAM FOR AUTHENTICATION PRINTING

(75) Inventors: Takeshi Hibino, Toyokawa (JP);
Kazuhiro Tomiyasu, Toyokawa (JP);
Tomoko Maruyama, Toyokawa (JP);
Masahiro Imamura, Toyokawa (JP);
Kentaro Nagatani, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 827 days.

(21) Appl. No.: 12/332,605

(22) Filed: Dec. 11, 2008

(65) Prior Publication Data
US 2009/0153895 A1    Jun. 18, 2009

(30) Foreign Application Priority Data
Dec. 13, 2007   (JP) ................................ 2007-321724

(51) Int. Cl.
*G06F 15/00* (2006.01)
*G06F 3/12* (2006.01)
(52) U.S. Cl. ...................... 358/1.15; 358/1.14
(58) Field of Classification Search ............. 358/1.1, 358/1.9, 1.13, 1.14, 1.15, 1.18; 709/201, 709/203, 238, 240; 399/11, 80, 81; 347/19
See application file for complete search history.

(56) References Cited

U.S. PATENT DOCUMENTS

| 7,725,924 B2* | 5/2010 | Terao ................................ 726/2 |
| 2002/0186410 A1* | 12/2002 | Tanaka .......................... 358/1.15 |
| 2004/0130744 A1* | 7/2004 | Wu et al. ....................... 358/1.15 |
| 2005/0100378 A1* | 5/2005 | Kimura et al. ................... 400/76 |
| 2005/0183141 A1* | 8/2005 | Sawada ............................ 726/16 |
| 2006/0005038 A1* | 1/2006 | Kitahara et al. .............. 713/182 |
| 2006/0104656 A1 | 5/2006 | Tomita et al. |

FOREIGN PATENT DOCUMENTS

| JP | 6-183110 A | 7/1994 |
| JP | 2005-084783 A | 3/2005 |

(Continued)

OTHER PUBLICATIONS

Notification of Reason(s) for Refusal issued in the corresponding Japanese Patent Application No. 2007-321724 dated Oct. 27, 2009, and an English Translation thereof.

*Primary Examiner* — Gabriel Garcia
(74) *Attorney, Agent, or Firm* — Buchanan Ingersoll & Rooney PC

(57) ABSTRACT

The present invention provides an image forming device terminal for enhancing the productivity of the image forming process such as printing. An image forming device terminal for instructing execution of a printout process on an image forming device capable of executing an authentication print printing, includes a selection accepting unit which accepts a selection of an image forming device for executing the printout process from a plurality of image forming devices; a determination unit which classifies the selected image forming device to a first type image forming device or a second type image forming device based on whether or not the selected image forming device is a default set image forming device; and a generating unit which generates job data as a printout process of not the authentication print printing in a case where the selected image forming device is the first type image forming device, and generates job data as a printout process of the authentication print printing in a case where the image forming device is the second type image forming device.

4 Claims, 17 Drawing Sheets

FOREIGN PATENT DOCUMENTS

| | | |
|---|---|---|
| JP | 2005-342964 | 12/2005 |
| JP | 2005-349694 | 12/2005 |
| JP | 2006-015625 A | 1/2006 |
| JP | 2006-145785 A | 6/2006 |
| JP | 2006-333196 | 12/2006 |
| JP | 2007-316739 | 12/2007 |

* cited by examiner

Fig. 8

PRINT

PRINTER
PRINTER NAME(N): PrimoPDF / KONICA MINOLTA C450 PCL / KONICA MINOLTA C550 FAX / KONICA MINOLTA C650/C550 PCL / KONICA MINOLTA C650/C550 PS

STATUS:
TYPE:
LOCATION:
COMMENT:

[ ] OUTPUT TO FILE(L)
[ ] MANUAL PAPER FEED AND DOUBLE-FACE PRINTING(X)

PROPERTY(P)
SEARCHING FOR PRINTERS(D)...

PRINT RANGE
(●) ALL(A)
( ) CURRENT PAGE(L)
( ) PAGE SETTING(G)
SPECIFY PAGES USING COMMA SUCH AS 1, 3, 6 OR SPECIFY PAGE RANGE SUCH AS 4-6

[1] [✓] PRINT COPIES IN UNITS(T)

PRINT TARGET(W): DOCUMENT
PRINT SPECIFICATION(R): ALL PAGES

ZOOM UP/DOWN
NUMBER OF PAGES PER ONE SHEET(H): ONE PAGE
SPECIFICATION OF SHEET SIZE(Z): MAGNIFICATION RATE NOT SPECIFIED

OPTION(O)...     OK     CANCEL 93, 95, 97, 73

Fig.9

| SETUP | PAGE UNIT SETTING | FORM | WATER MARK | IMAGE QUALITY | FONT | FAX | VERSION |

PROPERTY OF KONICA MINOLTA C450 PCL

PAPER

DIRECTION OF A DOCUMENT(O): ⦿ VERTICAL   ○ HORIZONTAL   [A]

DOCUMENT SIZE(G): A4 ▼

OUTPUT SIZE(S): SAME AS DOCUMENT SIZE ▼

ZOOM(Z): 100%

PAPER FEEDING TRAY(E): AUTO ▼

SHEET TYPE SETTING(T)...

BOOK BINDING(B)

BINDING POSITION: AUTO ▼

TYPE OF PRINTING: ONE SIDE ▼

☐ PAGE ALLOCATION(T)   ⬛ 2 in 1 ▼   DETAIL

☐ BINDING MARGIN(M)   ONE ▼

☐ STAPLE(L)   TWO ▼   DETAIL

☐ PUNCH HOLE(N)

☐ SADDLE STITCH/FOLD(D)

OUTPUT

OUTPUT METHOD(H): ☐ NORMAL PRINTING ▼

99

NUMBER OF COPIES(P): 1   (1-999)

PAPER DISCHARGING TRAY(Y): DEFAULT ▼

☑ SORT(C)

☐ ASSORTMENT(E)

☐ SUPPRESS WHITE PAPER(K)

☐ AUTHENTICATION/DEPARTMENT MANAGEMENT(U)...

z3

SAVE/CALL SETTING(V)...

VIEW(W): ⦿ PAPER ○ BODY

A4 (210×297mm)

RETURN BACK TO STANDARD SETTING(R)

[ OK ]   [ CANCEL ]   [ HELP ]

IMAGE FORMING DEVICE, IMAGE FORMING DEVICE TERMINAL, AND PROGRAM FOR AUTHENTICATION PRINTING

This application is based on an application No. 2007-321724 filed in Japan, the contents of which are hereby incorporated by reference.

BACKGROUND OF THE INVENTION

1. Field of the Invention

The present invention relates to an image forming device, an image forming device terminal for giving instructions to the image forming device, an image forming system made up of such devices, and a program used in the image forming system, and more particularly, to an image forming device which requests user authentication for the start of printout process, an image forming device terminal (an image formation instructing device) which gives a printout instruction to the image forming device, an image forming system made up of such devices, and programs used in the devices making up the image forming system.

2. Description of the Related Art

In recent years, the image forming device is connected to a plurality of information processing devices (image forming device terminals) by way of a network, and is shared by a plurality of users using the plurality of information processing devices. The image forming device is a digital multifunction peripheral (MultiFunction Peripheral (MFP), a Scan Print Copy (SPC), or All In One (AIO)) having at least two or more functions of a printer, a facsimile, a copying machine, a scanner, and the like. The information processing device (image forming device terminal) is a personal computer (PC), or the like. The image forming device and the information processing device are communicably connected to each other by way of a communication network such as Local Area Network (LAN) and the Internet to configure an image forming system. The image forming system can be formed by connecting one image forming device and one information processing device one-to-one in its minimum configuration. Recently, however, a large-scale image forming system is often being built up in which a plurality of image forming devices and a plurality of information processing devices are connected to each other.

When the user attempts to output a printed material of a desired document using the image forming device in such image forming system, the user uses the information processing device to specify the data file of the relevant document saved in the image forming system, select and specify the image forming device to execute the printout of the relevant document from a plurality of image forming devices in the image forming system, and finally, input an instruction to execute the printout to the information processing device.

The information processing device sends job data described with the specified data file and various setting data related to the printout to the specified image forming device. The image forming device that received the job data executes printing based on the job data. The document printed material is discharged from a paper discharge tray of the image forming device. The user then goes to the image forming device and collects the discharged document printed material.

However, the user is not necessarily nearby the image forming device when the document printed material is discharged from the image forming device. Since the image forming device is shared by a plurality of users, another user might be near the image forming device. Thus, a problem of ensuring information security related to the document printed material discharged from the image forming device arises in the image forming system.

JP 6-183110 A discloses a printing device (printer). Such printing device receives print data from a plurality of host computers connected by way of a network, and executes printing based on the received print data. The print data sent to the printer may contain a password. Thus, when receiving the print data from the computer, the printer determines whether or not a password is contained in the received print data. When determined that the received data contains a password, the printer executes the printout based on the received print data only after confirming that the user has correctly input the password through a user interface of the printer.

The printing device disclosed in JP 6-183110 A executes printing when the password given to the print data is matched with the password input by the user. The relevant printing device ensures information security on the information included in the print data in this manner.

The technique disclosed in JP 6-183110 A is a technique in which the printing device requests for a password to be input by the user, that is, user authentication as a trigger for defining the start of printout, and is not a technique in which the printing device determines whether or not to perform the user authentication serving as a trigger for defining the start of printout for each printout process.

JP 2006-145785 A discloses an image forming device. Such image forming device can ask another image forming device to perform the user authentication process in an environment in which data can be transmitted and received with another image forming device via the network.

Therefore, in the image forming device disclosed in JP 2006-145785 A, all the information necessary for carrying out the user authentication do not need to be provided in the image forming device. The image forming device of JP No. 2006-145785 A thus succeeded in saving work load necessary for the user to register the information of the user authentication in the image forming device in advance.

JP 2006-15625 A discloses an image processing device. Such image processing device includes a job information display means capable of displaying information of the job registered in the image forming device. In addition, the image processing device restricts the display of information on the job on the job information displaying means with respect to the job provided with authentication information, thereby ensuring confidentiality of the job. The restriction on such job is canceled only when the image processing device succeeds in user authentication based on the authentication information, whereby the information related to the specific registered job can be displayed on the job information displaying means.

The user authentication is subsequently executed on a regular basis, and the restriction canceled state of the job information display is continued during the period the image processing device succeeds in user authentication. The relevant image processing device thus ensures operability with respect to the image processing device of the user who registered the job provided with authentication information.

JP 2005-84783 A discloses a printing system. The printing system includes a print instructing device for sending a print instruction to the printing device, and the printing device for executing printing in response to the print instruction. The printing system holds information related to the installed position of the printing device, which information related to the installed position of the printing device is appropriately provided to the print instructing device.

Thus, when the user selects the printing device to send the print instruction at the print instructing device, the user can select the printing device to actually send the print instruction by referencing the information related to the installed position of the printing device. In the printing system disclosed in JP 2005-84783 A, the user can rapidly determine the desired printing device in view of the installed position of the printing device.

Numerous documents related to information security of the image forming system have been proposed.

The image forming device for performing user authentication through predetermined user authentication means arranged in the image forming device at the start of execution of the printout as disclosed in JP 6-183110 A is already widely known. The technical methodology adopted in the technique of JP 6-183110 A is an effective methodology for ensuring the user to be near the image forming device when the image forming device actually executes the printout.

However, it is sometimes bothersome for the user to perform user authentication on the predetermined user authentication means arranged in the image forming device to cause the image forming device to actually start the execution of the printout. The user particularly feels bothered about the user authentication when the information processing device to which the user has input the print instruction and the image forming device that executes the printout are relatively close in terms of distance, or when a person who is not desirable in terms of information security related to the document printed material is in the same room as the user.

SUMMARY OF THE INVENTION

In view of such problems, it is an object of the present invention to provide an image forming device etc. for automatically and appropriately determining whether or not to perform user authentication using a predetermined user authentication unit arranged in the image forming device to start the execution of the printout based on a given condition for each printout job the image forming device receives. The present invention enhances operability of the user with respect to the image forming device while ensuring information security related to the printed and discharged document printed material at high level, thereby enhancing the productivity of the image forming process such as printing.

In one aspect of the invention, the present invention is an image forming device terminal for instructing an execution of a printout process on an image forming device capable of executing an authentication print printing, which is a printout process of performing user authentication using a predetermined authentication device and determining start of execution of the printout process based on a result of the user authentication. The image forming device terminal includes: a selection accepting unit which accepts a selection of a image forming device for executing the printout process from a plurality of image forming devices; a determination unit which classifies the selected image forming device to a first type image forming device or a second type image forming device based on whether or not the selected image forming device is a default set image forming device; and a generating unit which generates job data instructing the printout process to the selected image forming device as a printout process of not the authentication print printing in a case where the selected image forming device is the first type image forming device, and generates job data instructing the printout process to the selected image forming device as a printout process of the authentication print printing in a case where the selected image forming device is the second type image forming device.

In another aspect of the invention, the present invention is a computer readable medium storing an image forming device control program executed by a computer of an image forming device terminal for instructing an execution of a printout process on an image forming device capable of executing an authentication print printing, which is a printout process of performing user authentication using a predetermined authentication device and determining start of execution of the printout process based on a result of the user authentication. The program includes: code that accepts a selection of a image forming device for executing the printout process from a plurality of image forming devices; code that classifies the selected image forming device to a first type image forming device or a second type image forming device based on whether or not the selected image forming device is a default set image forming device; and code that generates job data instructing the printout process to the selected image forming device as a printout process of not the authentication print printing in a case where the selected image forming device is the first type image forming device, and generates job data instructing the printout process to the selected image forming device as a printout process of the authentication print printing in a case where the image forming device is the second type image forming device.

In a further aspect of the invention, the present invention is an image forming device capable of executing an authentication print printing, which is a printout process of performing user authentication using a predetermined authentication device and determining start of execution of the printout based on a result of the user authentication. The image forming device includes: a communication interface, communicating with an external terminal, which receives job data from the terminal; a terminal attribute determination unit which references source terminal information or information of the terminal, which transmitted the job data, contained in the job data and determines and outputs attribute of the terminal; an authentication print determination unit which determines whether or not to execute the job related to the job data as the authentication print printing based on the information output by the terminal attribute determination unit; an authentication unit which is the predetermined authentication device; a user authentication unit which outputs the result of the user authentication using the authentication unit; and a job executing unit which executes the job related to the job data determined to be executed as the authentication print printing based on the result of the user authentication.

In a yet further aspect of the invention, the present invention is an image forming device capable of executing an authentication print printing, which is a printout process of performing user authentication using a predetermined authentication device and determining start of execution of the printout based on a result of the user authentication. The image forming device includes: a communication interface, communicating with an external terminal, which receives job data from the terminal; a user attribute determination unit which references transmitter information or information of a user, who transmitted the job data, contained in the job data and determines and outputs attribute of the transmitter; an authentication print determination unit which determines whether or not to execute the job related to the job data as the authentication print printing based on the information output by the user attribute determination unit; an authentication unit which is the predetermined authentication device; a user authentication unit which outputs the result of the user authentication using the authentication unit; and a job executing unit which executes the job related to the job data determined to be executed as the authentication print printing based on the result of the user authentication.

In a different aspect of the invention, the present invention is a computer readable medium storing an image forming program executed by an image forming device capable of executing an authentication print printing, which is a printout process of performing user authentication using a predetermined authentication device and determining start of execution of the printout based on a result of the user authentication. The program includes: code that receives job data from the terminal, communicating with an external terminal; code that references source terminal information or information of the terminal, which transmitted the job data, contained in the job data and determines and outputs attribute of the terminal; code that determines whether or not to execute the job related to the job data as the authentication print printing based on the information output by the terminal attribute determination unit; code that outputs the result of the user authentication using a authentication unit which is the predetermined authentication device; and code that executes the job related to the job data determined based on the result of the user authentication.

The present invention provides an image forming device capable of automatically and appropriately determining whether or not to perform user authentication using a predetermined user authentication means arranged in the image forming device based on a predetermined condition for each job the image forming device receives at the start of execution of printout in the image forming device for performing printout based on job data sent from an information processing device, an image forming device terminal, an image forming system, or a program. In the image forming process using the present invention, the user authentication using the user authentication unit arranged in the image forming device is automatically set so as not to be performed under a situation it is considered unnecessary in terms of ensuring information security at the start of execution of the printout. Thus, the user can rapidly perform the printout without being bothered by the unnecessary user authentication procedures, and the operability of the user on the image forming device significantly enhances. When the image forming device etc. according to the present invention determines that the user authentication is necessary in terms of ensuring information security based on a predetermined parameter, the image forming device etc. automatically changes the setting to request user authentication to the user at the start of execution of the printout. Thus, information security on the printout is sufficiently ensured in the present invention. The image forming device etc. according to the present invention thus sufficiently ensures information security of the document printed material printed out and enhances the operability of the user on the image forming device etc., thereby enhancing the productivity of the image forming process.

Other objects and further features of the present invention will be apparent from the following detailed description when read in conjunction with the accompanying drawings.

BRIEF DESCRIPTION OF THE DRAWINGS

FIG. 8 is a display example of the display unit 73;

FIG. 9 is a display example of the display unit 73;

DETAILED DESCRIPTION OF THE PREFERRED EMBODIMENTS

Figure 1:
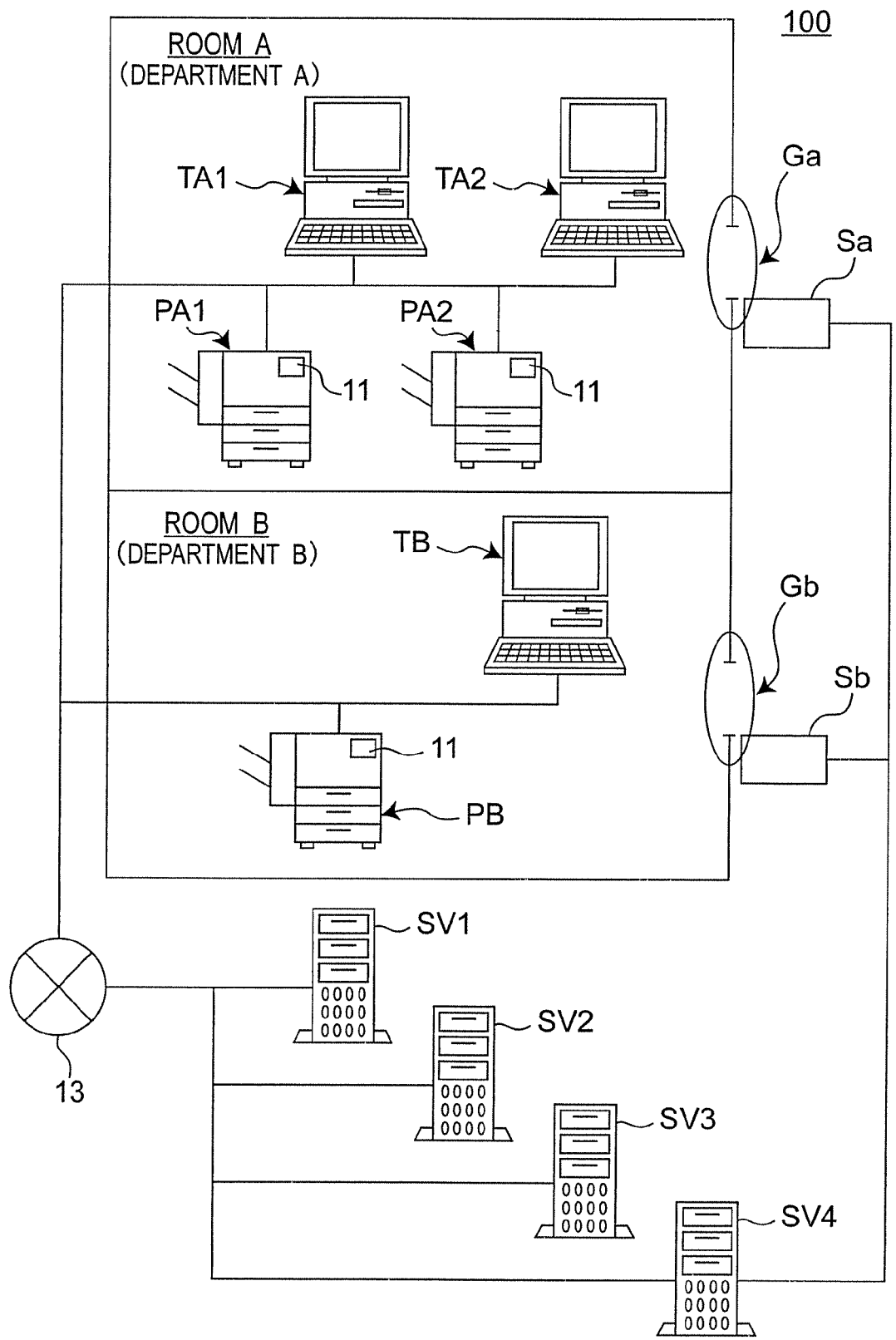
FIG. 1 is a configuration diagram of an image forming system according to an embodiment of the present invention.

The present embodiment relates to an image forming device, an image forming device terminal, an image forming system including such devices, and a program executed in at least one of the devices configuring the image forming system.

The image forming device according to the present embodiment is an image forming device capable of executing "authentication print (authentication & print)" printout process, to be hereinafter described. Furthermore, the image forming device according to the present embodiment is an image forming device capable of executing the printout process by appropriately switching between the "authentication print" printout process and a normal printout process for every job to be executed. Such switching is automatically executed by the image forming device based on information contained in the job data and/or information appropriately acquired by the image forming device.

The image forming device terminal can generate the job data. Therefore, the switching can be set in the image forming device terminal. In this case, the image forming device references the switch setting set in the image forming device terminal and executes the printout by automatically switching between the "authentication print" printout process and the normal printout process.

In the image forming device etc. according to the present embodiment, the image forming device etc. makes a determination on the necessity to execute the "authentication print" printout setting even when the user forgets to turn "ON" the "authentication print" printout setting, and automatically turns ON the "authentication print" printout setting of the printout process when determining that the relevant execution is necessary, and then executes the printout.

Thus, in the image forming system according to the present embodiment, if one of the devices configuring the image forming system determines to execute the printout as the "authentication print" printout process in terms of ensuring information security even if the user prioritizes operability and productivity of the image forming device etc., and the device is normally operated with the setting of the "authentication print" printout turned "OFF", switch is automatically made to the "authentication print" printout and the printout is executed. Therefore, both ensuring of convenience and productivity of the image forming process, and ensuring of information security are met at high level in the image forming process using the image forming system of the present embodiment.

In the present embodiment, even if the user forgets to switch the "authentication print" printout setting from "ON" to "OFF", the image forming device etc. determines the necessity to execute the "authentication print" printout setting, and executes the printout after automatically turning OFF the "authentication print" printout setting of the relevant output process when determining that the relevant execution is unnecessary.

<Regarding "Authentication Print (Authentication & Print)" Printout Process>

The "authentication print (authentication & print)" printout process will be briefly described before specifically describing the embodiment of the present invention. The "authentication (&) print" printing refers to a printout mode. In a case where the image forming device executes the job involving the printout process, the image forming device starts the printout on the job only when the image forming device performs user authentication using a predetermined authentication means and then the user authentication is successful. In other words, in the authentication print printout, the image forming device does not immediately execute the printout even when accepting the job. Instead, the image forming device holds the data related to the printout until confirming that the user authentication using the predetermined authentication means is successful, and starts the execution of the printout after confirming that the user authentication is successful. The user authentication herein is a user authentication on the user who inputs the job. The authentication print is also referred to as "Touch & Print".

In the "normal" printout process, the image forming device immediately executes the printout on the job when accepting the job. The authentication print printout process differs from the normal printout process in that the printout does not start until the user authentication using the predetermined authentication means is successful.

The preferred embodiments of the present invention will now be described with reference to the accompanied drawings.

FIG. 1 is a schematic diagram of a configuration of an image forming system 100 according to an embodiment of the present invention.

The image forming system 100 includes a plurality of digital multifunctional peripherals (MFP) PA1, PA2, PB serving as an image forming device, and a plurality of personal computers (PC) TA1, TA2, TB serving as an image forming device terminal. The plurality of MFPs (PA1, PA2, PB) and the plurality of PCs (TA1, TA2, TB) are communicably connected by way of a network 13.

Each digital multifunction peripheral PA1, PA2, PB configures an image forming device according to the present embodiment. The digital multifunction peripheral (MFP) is an image forming device collectively having plural functions such as print function, copy function, scanner function, facsimile function, e-mail transmission function, and the like. However, the image forming device according to the present embodiment merely needs to be an image forming device capable of receiving the job data transmitted from the image forming device terminal via the network, and executing the printout process based on the relevant job data. Each MFP (PA1, PA2, PB) is also equipped with an authentication unit 11 serving as a predetermined authentication means (unit) for performing user authentication in the authentication print printout process. The authentication unit 11 does not necessarily need to be built in the body of the MFP (PA1, PA2, PB). The authentication unit 11 merely needs to be connected to the respective MFP (PA1, PA2, PB), and arranged proximate thereto.

Each personal computer TA1, TA2, TB executes the image forming device control program according to the present embodiment to configure an image forming device terminal (information processing device) according to the present embodiment. The image forming device terminal according to the present embodiment does not need to be an information processing device having versatility such as personal computer. The image forming device terminal according to the present embodiment can be realized simply with a device capable of instructing printout of the document to the image forming device. The image forming device control program may be installed in advance in the image forming device terminal. Alternatively, the image forming device control program may be provided to the information processing device through a storage medium such as a flexible disc (FD) or an optical disc, or through communication means such as the Internet.

The image forming system 100 may also include a plurality of server devices SV1, SV2, SV3, and SV4.

The server device SV1 is an MFP (PA1, PA2) authentication server. The authentication server is a server having a function of comparing user identifying information (e.g., user ID) sent from a client (e.g., MFP (PA1, PA2, PB) and PC (TA1, TA2, TB) and user authentication information (e.g., password, authentication data) with user information and user authentication information held in its device, determining success/fail of the user authentication, and returning the determination result to the client. The authentication server SV1 herein is an authentication server responsible for the user authentication of the user belonging to department A. In the present embodiment, the user belonging to the department A normally works in room A. Similarly, the server device SV2 is also an authentication server. The authentication server SV2 is an authentication server responsible for the user authentication of the user belonging to department B. The user belonging to the department B normally works in room B.

The server device SV3 is a data server. The data server SV3 is a server that holds data file of a document and data of the job (job data) to be transmitted to the MFP (PA1, PA2, PB), and transmits the data file of the document and the job data in response to a request from the outside.

The server device SV4 is a room enter/exit management server. The room enter/exit management server SV4 is a server that cooperates with room enter/exit sensors Sa and Sb arranged near room enter/exit gates Ga and Gb of room A and room B to understand the human presence state in each room (A, B). The room enter/exit management server SV4 as well as the room enter/exit sensors Sa and Sb configure a room enter/exit management system.

However, the servers SV1, SV2, SV3, SV4 are not essential elements in the image forming system 100. An arbitrary MFP (e.g., PA1) or PC (e.g., TA1) configuring the image forming system may be provided with the function of the server as necessary.

<Hardware Configuration of the Image Forming Device>

Figure 2:
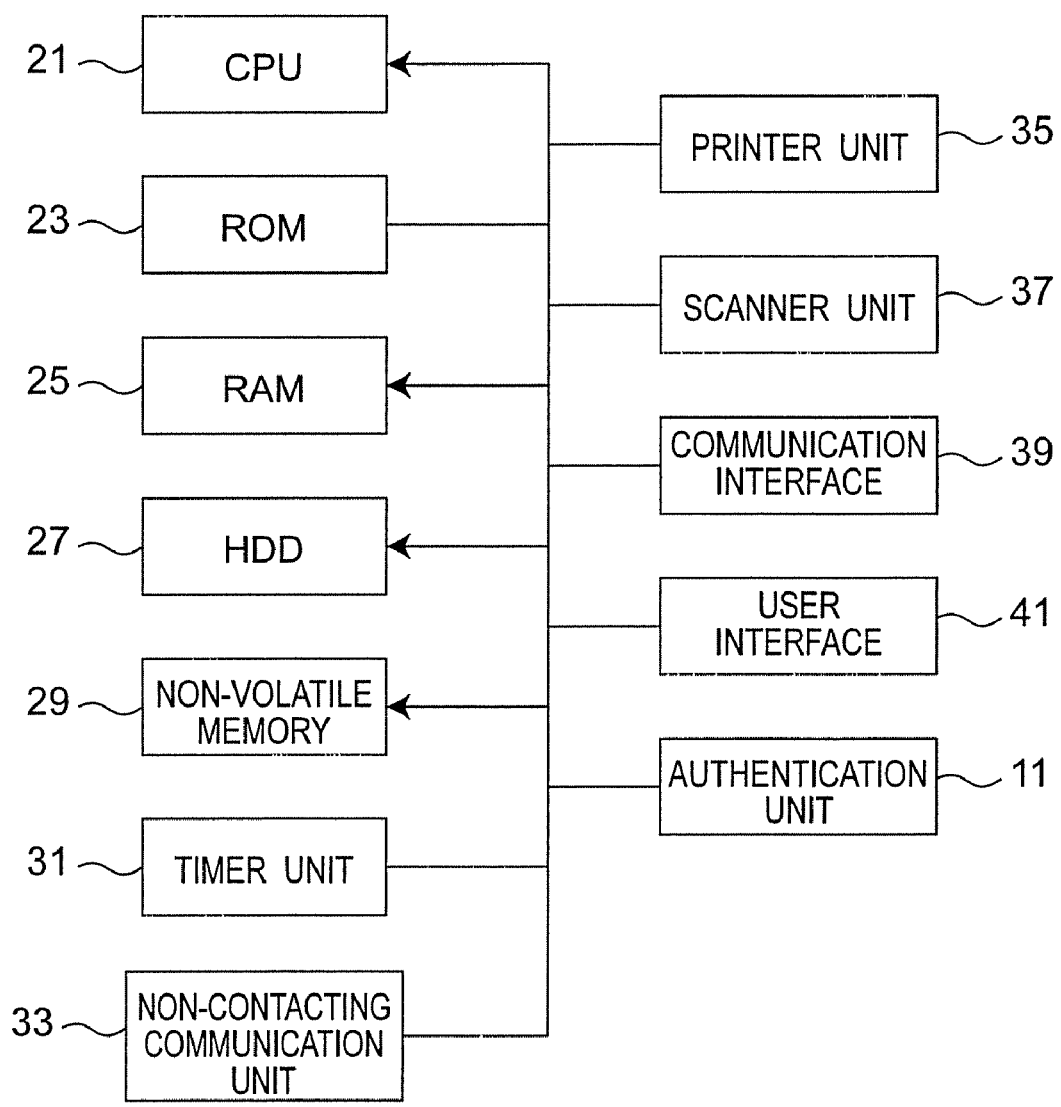
FIG. 2 is a hardware configuration diagram of an image forming device according to the embodiment of the present invention.

FIG. 2 is a block diagram of a hardware configuration of the MFP (PA1).

The MFP (PA1) includes a central processing unit (CPU) 21, a read-only memory (ROM) 23, a random access memory (RAM) 25, a hard disc drive (HDD) 27, a non-volatile memory 29, a timer unit 31, a non-contacting communication unit 33, a printer unit 35, a scanner unit 37, a communication interface 39, a user interface 41, and the authentication unit 11, which are connected to each other using a data bus.

The CPU 21 executes an image forming program held in the ROM 23, the RAM 25, or the HDD 27, or an image forming program provided via the communication interface 39, and processes the data held in the ROM 23, the RAM 25, or the HDD 27. The CPU 21 configures a control unit etc. of the MFP (PA1) (image forming device) by executing such programs, and realizes the function of the image forming device of the present embodiment. The image forming program may be installed in advance in the image forming device. Alternatively, the image forming program may be provided to the image forming device by way of a storage medium such as a flexible disc (FD) or an optical disc, or through a communication means such as Internet.

The ROM 23, the RAM 25, the HDD 27, and the non-volatile memory 29 are storage devices that hold data and programs. The MFP (PA1) appropriately and suitably uses such storage device groups, and holds the data and the programs that need to be held.

The timer unit 31 has a timing function, and outputs the current time in response to a request from the control unit.

The non-contacting communication unit 33 is a sensor for detecting the presence of an object and the movement of the object near the MFP (PA1).

The printer unit 35 executes printout based on the data of the document, and outputs a document printed material printed on a paper medium etc.

The scanner unit 37 photoelectrically reads the information recorded on the paper medium etc., and then generates image data of the relevant information.

The communication interface 39 is an interface for performing transmission and reception of data between the MFP (PA1) and an external device.

The user interface 41 is an operation unit for performing provision and reception of information with the user. The user interface 41 includes a display unit for presenting the information to the user and an input unit for receiving information from the user. The user interface 41 may be obtained by integrally configuring the display unit and the input unit using a liquid crystal touch panel. The user interface 41 may be used as a predetermined authentication unit for the authentication print printout process. The user may input information necessary for the user authentication using the user interface 41.

The authentication unit 11 is an information input device used in the user authentication for starting the execution of the printout in the authentication print printout process. The authentication unit 11 is a biometric authentication unit and the like. The authentication unit 11 is also an IC card reader for reading information recorded on an IC card possessed by the user. The authentication unit 11 is unnecessary when executing user authentication using a password input by the user. In this case, user authentication is executed when the user inputs a password etc. using the user interface 41.

<Functional Configuration of the Image Forming Device>

Figure 3:
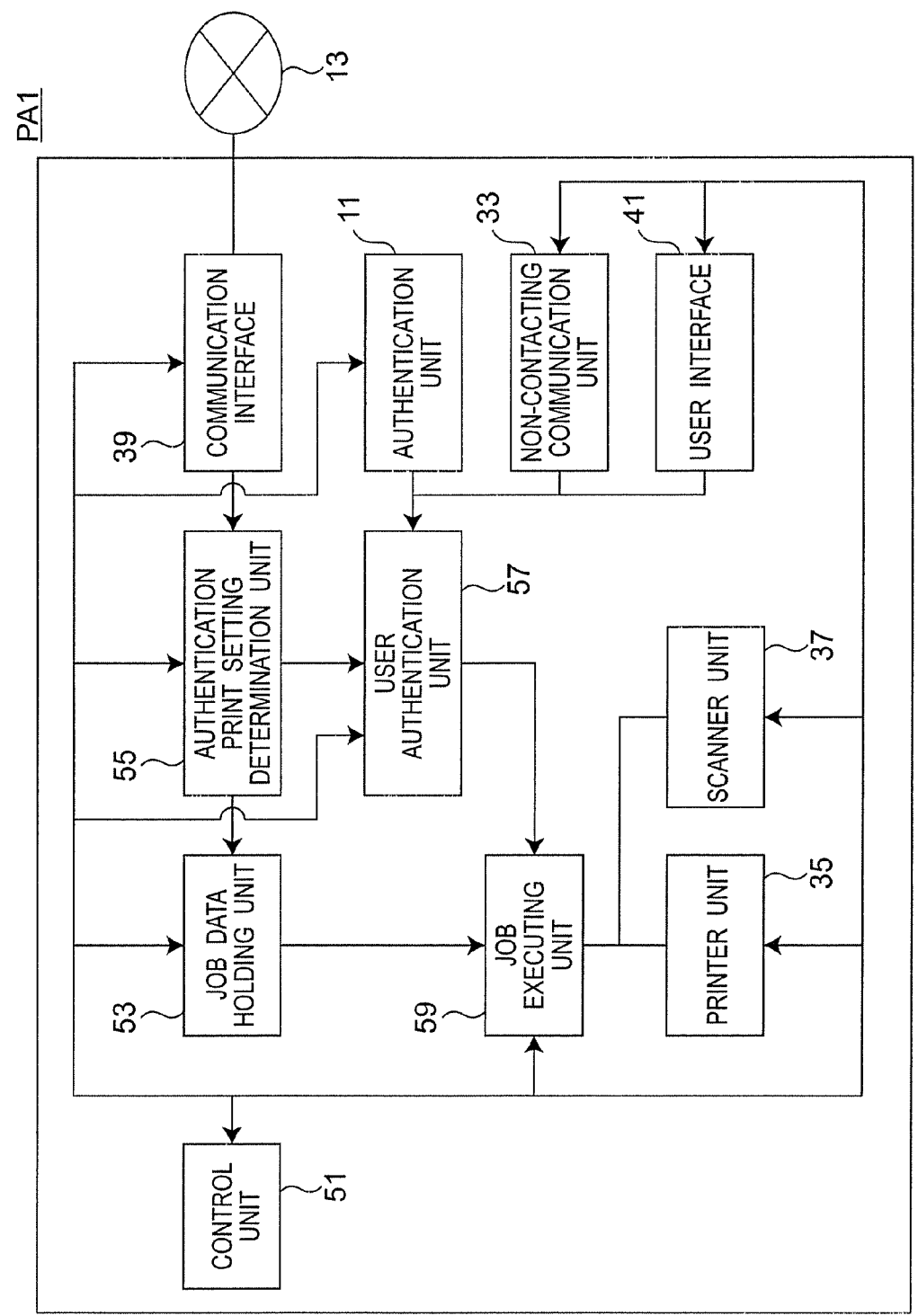
FIG. 3 is a block diagram of a functional configuration of the image forming device.

FIG. 3 is a block diagram of the configuration of the MFP (PA1) using functional blocks. Functions of the MFP (PA1) not related to the present embodiment are not illustrated.

The MFP (PA1) includes a control unit 51. The control unit 51 is realized when the CPU 21 (FIG. 2) executes the image forming program of the present embodiment, as described above. The control unit 51 is connected to each block of the MFP (PA1) to enable transmission and reception of data therewith, and understands the state of each block to appropriately control the operation of each block.

A job data holding unit 53 temporarily holds the data (e.g., job data containing data of the document to be printed) related to the printout job which authentication print printout process setting (hereinafter abbreviated as authentication print setting) is set to "ON" until user authentication is successfully completed. The job data holding unit 53 receives the job data from an authentication print setting determination unit 55, temporarily holds the job data, and sends the job data to a job executing unit 59. "ON/OFF" of the authentication print setting is determined by the authentication print setting determination unit 55 to be hereinafter described. The result of the relevant determination is recorded and held in an authentication print setting flag, which is one parameter that can be recorded in the job data, as "True" (correspond to "ON")/"False" (correspond to "OFF"). The job data holding unit 53 holds the job data which authentication print setting flag is "True".

The job executing unit 59 executes the job based on the received job data. However, regarding the job which authentication print setting is set to "ON", the job (e.g., printout) of the user related to the user authentication starts when the determination result of the user authentication output by the user authentication unit 57 is success.

The authentication print setting determination unit 55 receives the job data received via the communication interface 39, references the job data, and determines whether the authentication print setting of the job indicated by the job data is "ON" or "OFF". That is, the authentication print setting unit 55 references the authentication print setting flag of the job data, and recognizes the set state of the authentication print setting of the job data based on whether the state of the flag is "True" or "False".

In the modification hereinafter described, the MFP (PA1 etc.) according to the present embodiment can change the state of the authentication print setting flag to "True" or to "False" based on information different from the authentication print setting flag acquired by the MFP (PA1). In other words, the MFP (PA1 etc.) according to the present embodiment can rewrite the authentication print setting flag based on information different from the authentication print setting flag, and switch the authentication print setting of the job data.

The user authentication unit 57 performs user authentication using the authentication unit 11, the user interface 41, and the like when the authentication print setting of the job data is set to "ON", and outputs the determination result of the user authentication. The authentication is performed by transmitting the information input from the authentication unit 11 and the like to the authentication server SV1 (FIG. 1) to ask the authentication server SV1 to perform the authentication so as to receive the result of authentication from the authentication server SV1. Alternatively, information necessary for the user authentication may be provided in the MFP (PA1) in advance, and the user authentication may be completed only with the MFP (PA1).

<Hardware Configuration of the Image Forming Device Terminal>

Figure 4:
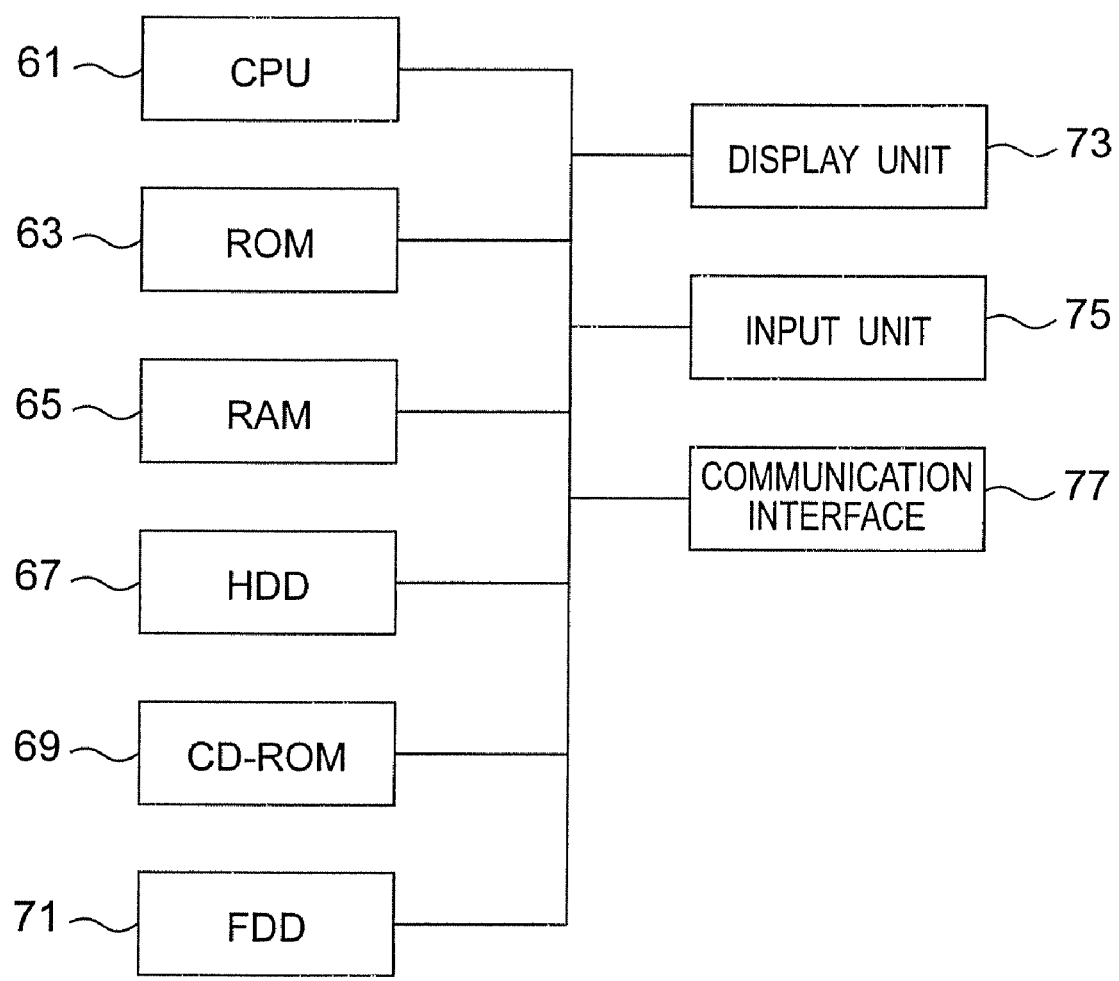
FIG. 4 is a hardware configuration diagram of an image forming device terminal according to the embodiment of the present invention.

FIG. 4 is a block diagram of a hardware configuration of the PC (TA1).

The PC (TA1) may be a general personal computer. As well-known, the PC (TA1) includes a central processing unit (CPU) 61, a read-only memory (ROM) 63, a random access memory (RAM) 65, a hard disc drive (HDD) 67, a compact disc-ROM drive (CD-ROM drive) 69, a flexible disc drive (FDD) 71, a display unit 73, an input unit (keyboard, mouse, etc.) 75, and a communication interface 77, which are connected to each other using a data bus.

The CPU 61 executes an image forming device control program held in the ROM 63, the RAM 65, the HDD 67, the CD-ROM driver 69, or the FDD 71, or the image forming device control program provided via the communication interface 77, and processes the data held in the RAM 65, the HDD 67, and the like. The CPU 61 configures the control unit etc. of the PC (TA1) (image forming device terminal) by executing such programs, and realizes the image forming device terminal of the present embodiment.

The ROM 63, the RAM 65, the HDD 67, the CD-ROM drive 69, and the FDD 71 are storage devices that hold data and programs. The PC (TA1) appropriately and suitably uses such storage device groups, and holds the data that need to be held.

The display unit 73 is a display device. The display unit 73 displays information necessary for operating the MFP (PA1 etc.) to the user.

The input unit 75 is a keyboard, a mouse, or the like. The user inputs information necessary for operating the MFP (PA1 etc.) to the PC (TA1) using the input unit 75.

The communication interface 77 is an interface for performing transmission and reception of data between the PC (TA1) and an external device.

<Functional Configuration of the Image Forming Device Terminal>

Figure 5:
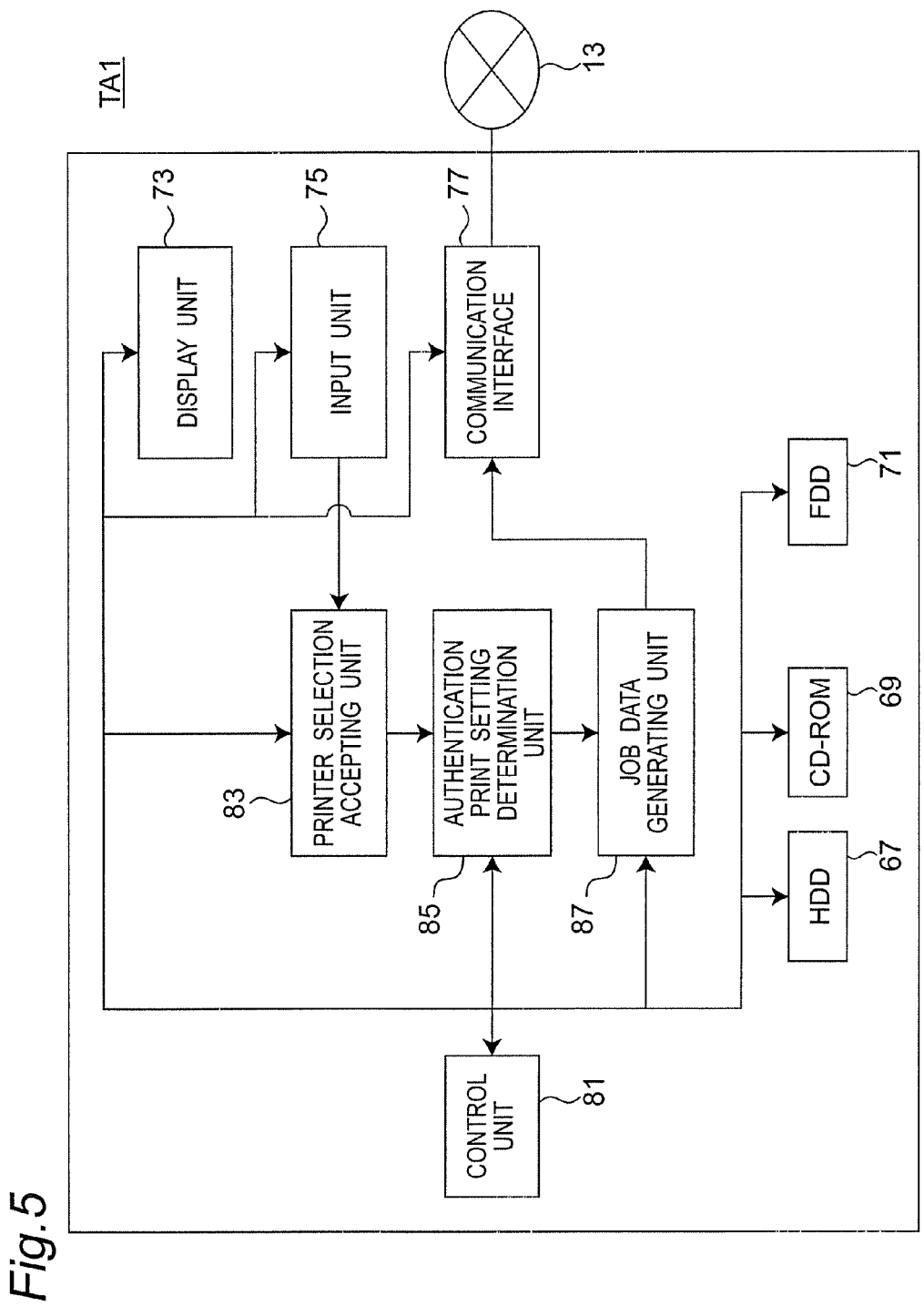
FIG. 5 is a block diagram of a functional configuration of the image forming device terminal.

FIG. 5 is a block diagram showing the configuration of the PC (TA1) using functional blocks. Functions of the PC (TA1) not related to the present embodiment are not illustrated.

The PC (TA1) includes the control unit 51. The control unit 51 is realized when the CPU 61 (FIG. 4) executes the image forming device control program of the present embodiment, as described above. The control unit 51 is connected to each block of the PC (TA1) to enable transmission and reception of data therewith, and recognizes the state of each block to appropriately control the operation of each block.

A printer selection accepting unit 83 accepts the selection of the printer (image forming device) to be used in executing the job (printout) input by the user through the input unit 75. The selection of the printer (image forming device) to be used in executing the job (printout) is input by the user through the input unit 75. The printer selection accepting unit 83 sends information ("selected image forming device information") indicating which printer (image forming device MFP (PA1, PA2, or PB)) the user has selected to an authentication print setting determination unit 85.

The authentication print setting determination unit 85 receives the selected imaged forming device information, determines whether to have the job (printout) in the authentication print printout process or the normal printout process based on the selected image forming device information, and sends the result of the determination to a job data generating unit 87.

The authentication print setting determination unit 85 distinguishes the selected printer (image forming device PA1, PA2, or PB) indicated by the selected image forming information to a first type image forming device or a second type image forming device according to a predetermined classification rule, and determines whether to have the job (printout) in the authentication printout process or the normal printout process based on the distinction. In brief, the first type image forming device is an image forming device in which risk on information security is assumed as low even if the normal printout process is performed, and the second type image forming device is an image forming device in which risk on information security is assumed as high if the normal printout process is performed.

The predetermined classification rule is whether or not the selected printer is the printer set as "normally used printer" in the PC (TA1). "Normally used printer" is the printer (image forming device) (default printer) assigned to be the printer that executes the printout in default setting out of the printers available to the PC (TA1). In this case, the authentication print setting determination unit 85 recognizes the selected printer as the first type image forming device if the selected printer is the "normally used printer". On the other hand, the authentication print setting determination unit 85 recognizes the selected printer as the second type image forming device if the selected printer is not the "normally used printer". The printer set as the "normally used printer" has a high possibility of being installed in the same department (room) or near the user, and thus the risk on information security is assumed to be low even if the normal printout process is performed.

Alternatively, or in addition thereto, the selected printer may be distinguished to the first type image forming device and the second type image forming device of the image forming device using the classification rule of whether or not the selected printer is installed in the same department (or the same room) (i.e., same place) with respect to the PC (TA1) as the predetermined classification rule. In this case, the authentication print setting determination unit 85 recognizes the selected printer as the first type image forming device when the selected printer is the image forming device PA1 or PA2 (FIG. 1) installed in the same department (place) as the PC (TA1). On the other hand, the authentication print setting determination unit recognizes the selected printer as the second type image forming device if the selected printer is the image forming device PB not installed in the same department (place) as the PC (TA1). The printer that is not installed in the same department (or room) (place) is installed in a place distant from the room or the place the user is present, and the risk on information security is assumed to be very high if the normal printout process is performed using such printer.

The classification rule of the above two examples both may be used. In this case, the authentication print setting determination unit 85 recognizes the selected printer as the first type image forming device if the selected printer is the "normally used printer", or is the image forming device installed in the same department as the PC (TA1). The authentication print setting determination unit 85 recognizes the selected printer as the second type image forming device if the selected printer is not the "normally used printer" nor the image forming device installed in the same department as the PC (TA1).

In this manner, the authentication print setting determination unit 85 recognizes the selected printer as the first type image forming device or the second type image forming device based on the received selected image forming device information, and determines the job (printout) as the normal printing process if the selected printer is the first type image forming device. The job (printout) is determined as the authentication print printout process if the selected printer is the second type image forming device. The result of the determination is sent to the job data generating unit 87.

The authentication print setting determination unit 85 may forcibly switch the setting based on the selected image forming device information and the predetermined classification rule even if the user has input and specified the "ON"/"OFF" setting of the authentication print setting in advance.

Whether or not the selected printer is installed in the same department (or room) as the PC (TA1) is identified based on the IP address etc. set to the selected printer.

The job data generating unit 87 generates the job data to be transmitted to the selected printer. The job data may contain job attribute data including data indicating the attributes of the job, and the data file (image data file) of the document used in the execution of the job. The job data generating unit 87 creates the job attribute data, and generates the job data with the data file of the document saved in the HDD 67 etc. and the created job attribute data. In this case, the job data generating unit 87 describes the parameter (authentication print setting flag) of the authentication print setting contained in the job attribute data according to the authentication print setting output by the authentication print setting determination unit 85.

The job data generated in the job data generating unit 87 is sent to the selected printer (e.g., MFP (PA1)) via the communication interface 77. The selected printer receives the job data, and executes the authentication print printout or the normal printout according to the parameter of the authentication print setting contained in the job attribute data of the job data.

<Image Forming Process Flow>

The flow of process in the image forming device terminal in a case where the user instructs the printout using the image forming device of the image forming system at the image forming device terminal of the present embodiment will be described with reference FIG. 6.

Figure 6:
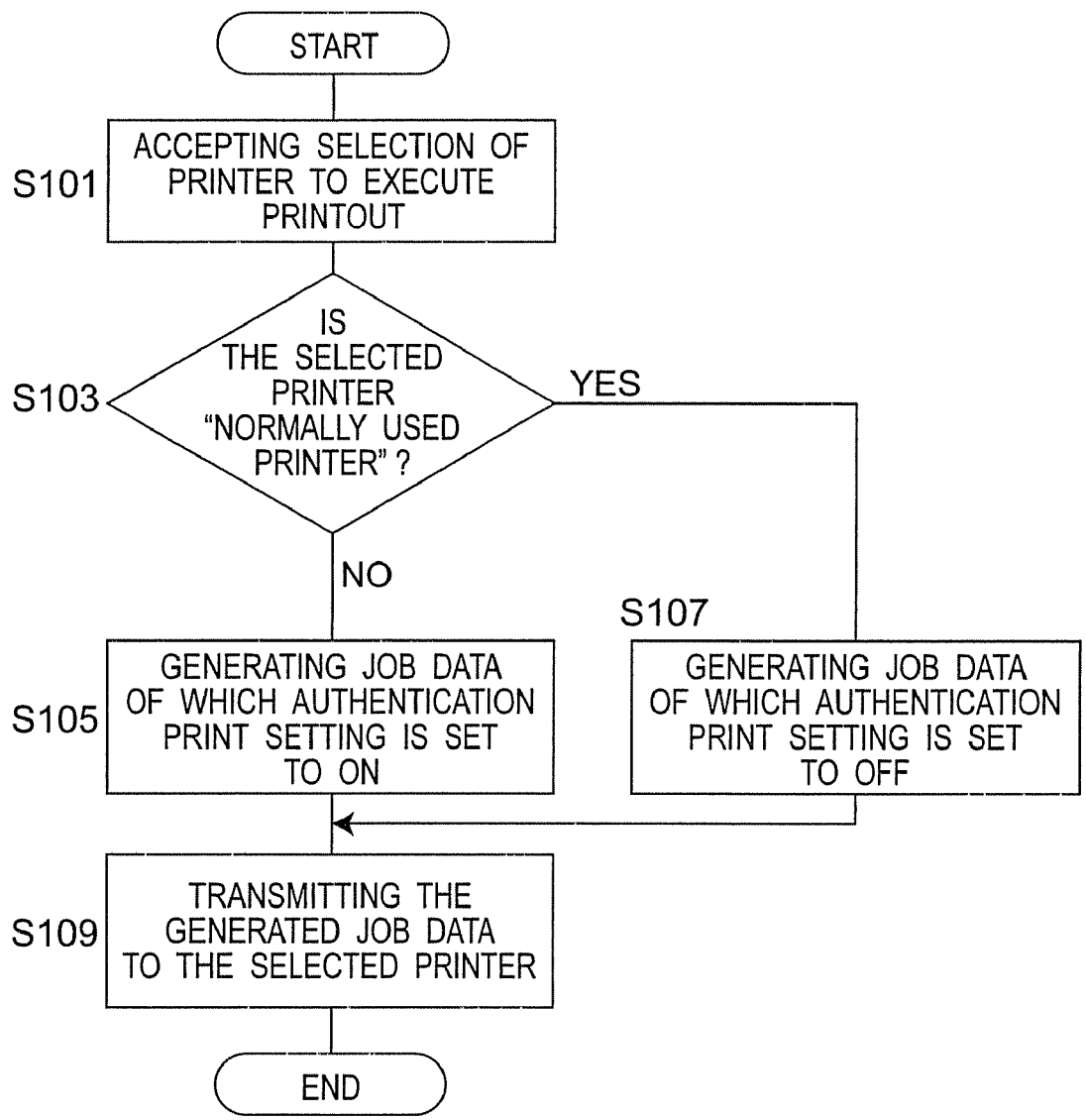
FIG. 6 is a flowchart of a process in the image forming device terminal.

FIG. 6 is a flowchart of the flow of process in the image forming device terminal.

Figure 7:
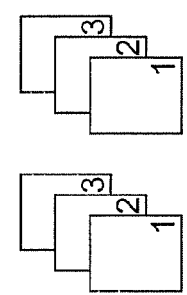
FIG. 7 is a display example of a display unit 73.

In relation to step S101, the user instructs the execution of the job involving printing of the document to the PC (TA1). In this case, the user selects the printer (image forming device) for printing out the document, and inputs the same to the PC (TA1). FIG. 7 is a view of a display example of the display unit 73 related to the selection of the printer for executing the printout.

The normally used printer (default printer) is already shown on the screen of the display unit 73 as a display 91. When a pull-down button at the right side of the display 91 is clicked, a list box showing a list of available printers is displayed. FIG. 8 is a diagram of a display example of the display unit 73 in a state displaying the list box. Therefore, the normally used printer 95 and the other available printers 97 are distinctly displayed with the presence of the icon of a check mark.

FIG. 9 is a screen for performing the setting related to the selected printer. Therefore, an output method 99 can be manually operated by the user. However, as described above, the image forming system can execute the printout by automatically switching between the normal printout process and the authentication print printout process irrespective of the setting of the output method 99 in the present embodiment. The present system can automatically execute the authentication print printout process in a case where the risk on the information security is assumed to be high even if the user forgets to switch the output method.

In step 101, the printer selection accepting unit 83 of the PC (TA1) accepts the selection of the printer by the user, and creates and outputs the selected image forming device information according to the selection.

In step S103, the authentication print setting determination unit 85 of the PC (TA1) determines whether the printer selected in step S101 is the (first type image forming device), which is the normally used printer (default printer), or not the (second type image forming device) based on the selected image forming device information. If the selected printer is the normally used printer (default printer) ("YES" in step S103), the process proceeds to step S107. If the selected printer is not the normally used printer (default printer) ("NO" in step S103), the process proceeds to step S105. In either case, the result of the determination is sent to the job data generating unit 87.

In step S105, the job data generating unit 87 sets the method of printout to the authentication print printout process (authentication print setting ON), and creates the job data. Specifically, the job data generating unit 87 sets the authentication print setting flag of the job attribute data contained in the job data to "True".

In step S107, the job data generating unit 87 sets the method of printout to the normal printout process (authentication print setting OFF), and creates the job data. Specifically, the job data generating unit 87 sets the authentication print setting flag of the job attribute data contained in the job data to "False".

In step S109, the PC (TA1) transmits the job data generated by the job data generating unit 87 to the selected printer (image forming device) via the communication interface 77.

In the flowchart, the PC (TA1) determines whether the selected printer is the first type image forming device or the second type image forming device based on whether or not the selected printer is the "normally used printer". However, such determination may be made based on whether or not the selected printer is installed in the same department (or room) when seen from the image forming device terminal (PC (TA1)), as described above. Furthermore, classification may be carried out using two types of classification rules.

The job data is transmitted to the selected printer (e.g., MFP (PA1)).

Figure 10:
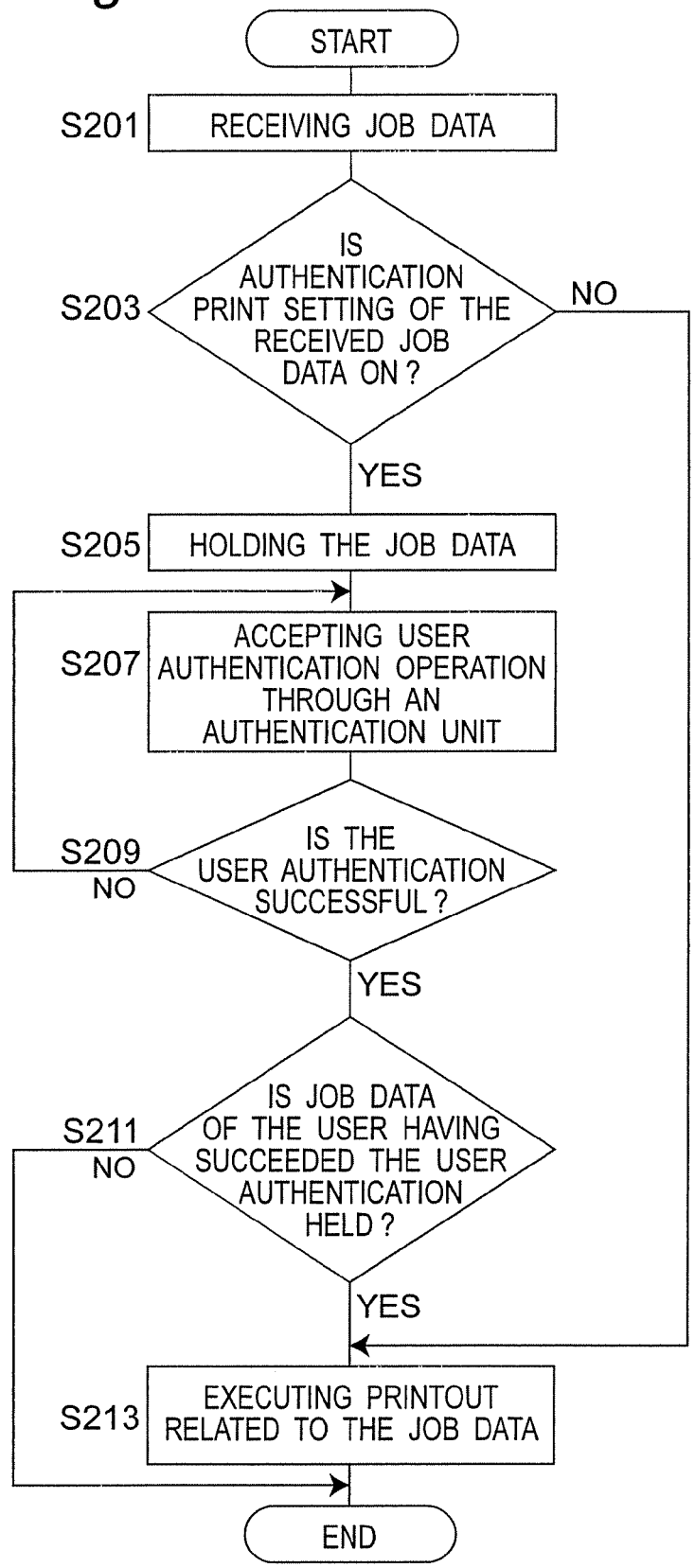
FIG. 10 is a flowchart of a process in the image forming device.

FIG. 10 is a flowchart of the flow of process performed by the MFP (PA1) that received the job data.

In step S201, the authentication print setting determination unit 55 of the MFP (PA1) receives the job data through the communication interface 39.

In step S203, the authentication print setting determination unit 55 of the MFP (PA1) determines whether or not the authentication print setting of the received job data is "ON". Specifically, the authentication print setting determination unit 55 references the authentication print setting flag of the job data attribute data of the job data, and makes the determination by looking at whether the state of the flag is "True" or "False". If the authentication print setting is set to "ON" ("YES" in step S203), the process proceeds to step S205. If the authentication print setting is set to "OFF" ("NO" in step S203), the process proceeds to step S213.

In step S205, the MFP (PA1) stores the job data in the job data holding unit 53, and temporarily holds the job data therein. The job data is set so as to perform the authentication print printout process, and thus the job data is stored in the job data holding unit 53 and is held therein until the user authentication is successful.

In step S207, the MFP (PA1) accepts user authentication operation using the authentication unit 11 (and/or user interface 41), which is a predetermined authentication means.

In relation to step S207, the user attempts user authentication using the predetermined authentication means arranged in the MFP (PA1).

Figure 11:
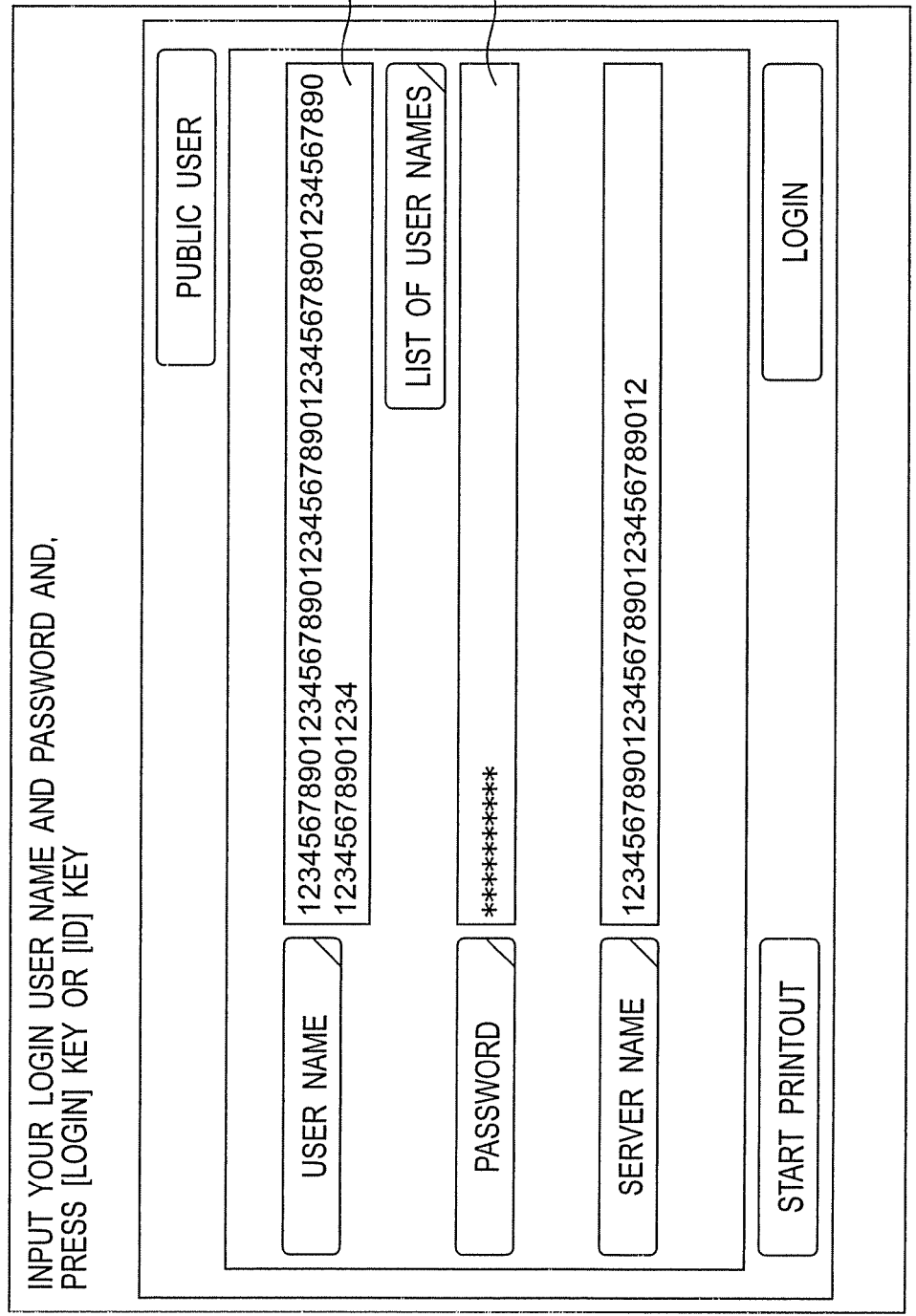
FIG. 11 is a display example of a user interface 41.

FIG. 11 is a diagram of a display example of the user interface 41. This example is a display example in a case where the user authentication is performed by user name and password input by the user using the user interface 41. The user inputs the user name to a user name text box 101 and inputs the password to a password text box 103.

In step S209, the user authentication unit 57 of the MFP (PA1) performs the user authentication and outputs the result of the determination ("success" or "fail"). If the result of the user authentication is "success" ("YES" in step S209), the process proceeds to step S211. If the result of the user authentication is "fail" ("NO" in step S209), the process returns to step S207, and the MFP (PA1) continues to accept the user authentication.

In step S211, the MFP (PA1) determines whether or not the job data of the job input by the user related to the relevant user authentication is held in the job data holding unit 53. If the job data is held in the job data holding unit 53 ("YES" in step S211), the process proceeds to step S213. If the job data of the job input by the user related to the relevant user authentication is not held in the job data holding unit 53 ("NO" in step S211), the process terminates.

In step S213, the job executing unit 59 of the MFP (PA1) executes the printout process related to the job data. If step S213 is executed immediately after step S203, the printout process is the normal printout process, and if step S213 is executed from step S203 after steps S205 to S211, the printout process is the authentication printout process.

Therefore, in the present embodiment, the image forming device terminal forcibly switches the authentication print setting automatically to "ON" or "OFF" based on whether or not the printer selected by the user is the default printer ("normally used printer"), and then generates the job data. From the standpoint of information security, the authentication print is automatically and forcibly set to the printout method in the printout using the printer of another department or the printout using the printer that is not set to default, which is assumed to have a high risk in the normal printout process, whereby information security is ensured.

The printout is automatically and forcibly switched to the normal printout process when performing the printout from the printer of default setting or the printer installed in the same department (or room). Therefore, enhancement in productivity and simple operability of the MFP are realized if the risk on information security is low even if the normal printout process is performed.

<Modification 1>

Figure 12:
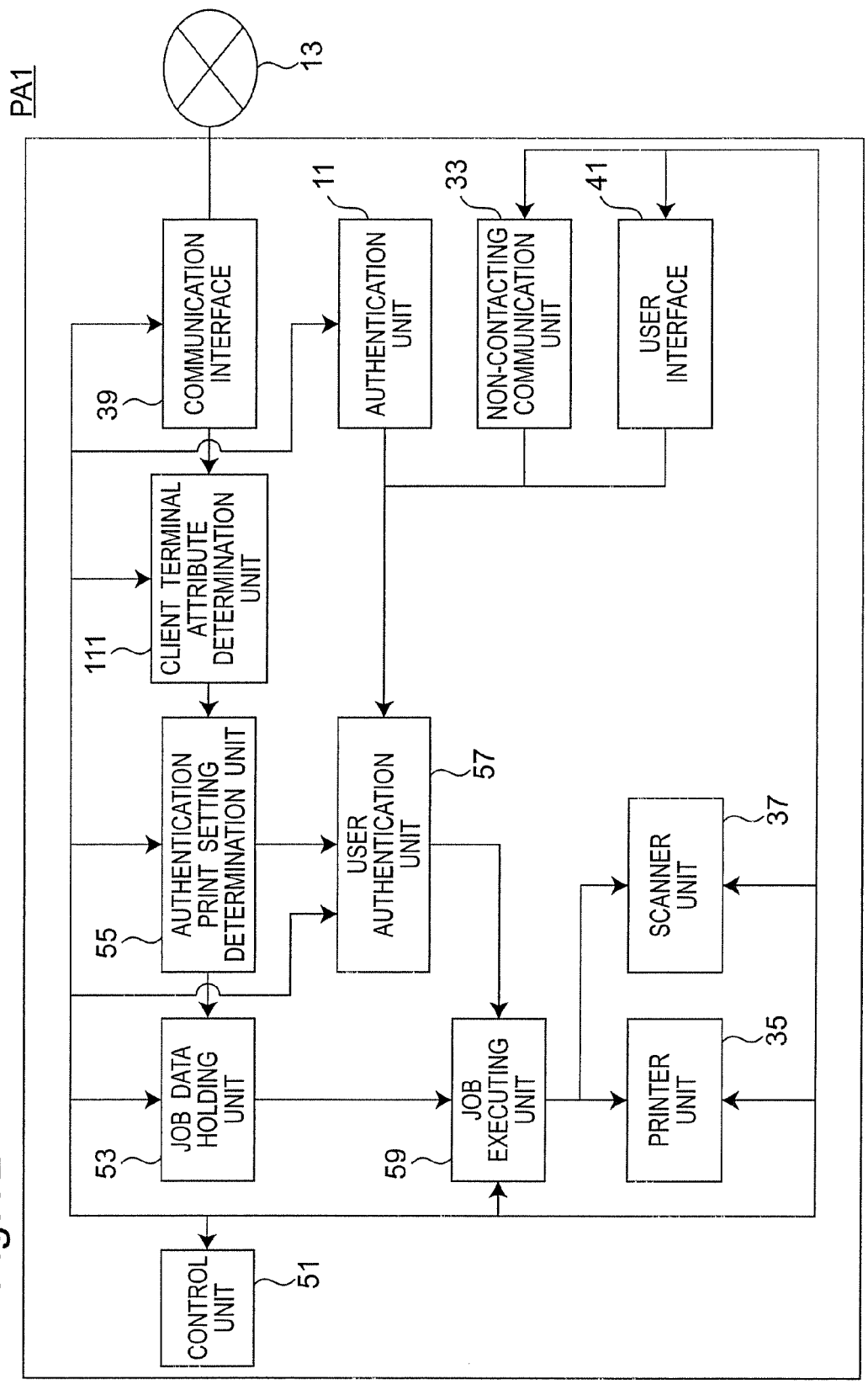
FIG. 12 is a block diagram of a functional configuration of a first modification of the image forming device.

FIG. 12 is a block diagram of a first modification of the MFP (PA1) of the present embodiment.

In the present modification, the image forming device sets ON/OFF of the authentication print setting based on a predetermined determination criteria and executes the printout process regardless of the state of the authentication print setting set in the image forming device terminal. In the present modification, the image forming device determines ON/OFF of the authentication print setting and executes the printout process based on the determination even if the image forming device receives job data in which a region (authentication print setting flag) of the parameter indicating the state of the authentication print setting does not exist in the job attribute data of the job data.

<Hardware Configuration of the Image Forming Device>

The hardware configuration of the image forming device is the same as the configuration described with reference to FIG. 2, and thus the description thereof will be omitted.

<Functional Configuration of the Image Forming Device>

FIG. 12 is a block diagram showing a functional configuration of the image forming device (MFP (PA1)) according to the first modification. The present modification differs from the configuration shown in FIG. 3 in that a client terminal attribute determination unit 111 is arranged.

In the present modification, the job attribute data of the job data normally contains information (source terminal information) of the terminal that transmitted the job data.

The client terminal attribute determination unit 111 references the source terminal information, and determines whether the image forming device terminal, which is the source of the job data, is a device installed in another department (or another room) seen from the MFP (PA1).

If the client terminal attribute determination unit 111 determines that the source image forming device terminal is the device belonging to another department seen from the MFP (PA1), the MFP (PA1) automatically and forcibly switches the printout process of the job data to the authentication print printout process. If the client terminal attribute determination unit 111 determines that the source image forming device terminal is the device belonging to the same department seen from the MFP (PA1), the MFP (PA1) automatically and forcibly switches the printout process of the job data to the normal printout process.

A method for the client terminal attribute determination unit 111 of the MFP (PA1) to execute such determination includes a method for determining based on an IP address of the image forming device terminal and information related to assignment of the IP address. In this case, the image forming system 100 preferably has information related to the assignment of the IP address in advance. Determination may also be made based on whether or not the IP address of the image forming device terminal is an IP address acquired using the DHCP (Dynamic Host Configuration Protocol), or the like. If the IP address of the image forming device terminal is the IP address acquired using the DHCP (Dynamic Host Configuration Protocol), the printout process of the job data is set to the authentication print setting.

The MFP (PA1) may, in advance, have information related to the relationship between the identification name of the source terminal and the department to which each image forming device terminal belongs, etc., which is valid in the image forming system, so that determination may be made based on the identification name of the source terminal.

<Image Forming Process Flow>

Figure 13:
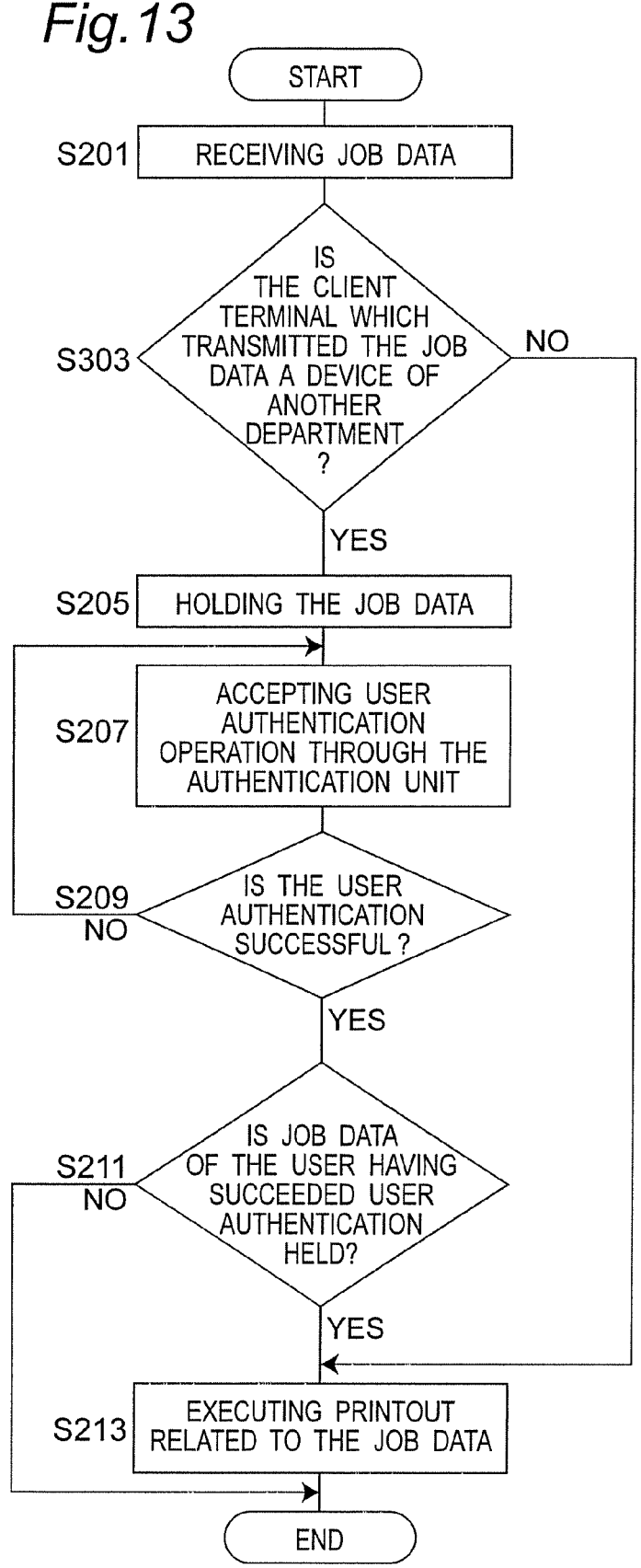
FIG. 13 is a flowchart of a process in the first modification of the image forming device.

FIG. 13 is a flowchart of a flow of process performed by the MFP (PA1). Among the steps in this flowchart, steps including contents same as in the steps of FIG. 10 are denoted with the same reference number. Detailed description on such steps will be omitted.

In step S201, the MFP (PA1) receives the job data sent from an external device.

In step S303, the client terminal attribute determination unit 111 of the MFP (PA1) references the source terminal information of the job attribute data of the job data, and determines whether or not the source terminal of the job data is the terminal installed in another department (or another room) seen from the MFP (PA1). The client terminal attribute determination unit 111 sets the authentication print setting flag of the job attribute data of the job data to either True/False based on the determination. The client terminal attribute determination unit 111 sets the authentication print setting flag to "True" if the source terminal is the device installed in a department different from the MFP (PA1), and the client terminal attribute determination unit 111 sets the authentication print setting flag to "False" if the source terminal is the device installed in the same department as the MFP (PA1).

The authentication print setting determination unit 55 references the authentication print setting flag set by the client terminal attribute determination unit 111 in step S303, and determines whether to execute the printout process related to the relevant job as the authentication print printout process or as the normal printout process.

Subsequent processes are the same as the contents already described, and thus will be omitted.

In the present modification, the image forming device automatically and forcibly determines ON/OFF of the authentication print setting based on the department etc. to which the terminal belongs irrespective of the authentication print setting set in the terminal, and executes the printout process. Thus, in this modification as well, the image forming device according to the present embodiment succeeds in solving the problems of ensuring information security, enhancing productivity and improving operability of the image forming device at high level.

<Modification 2>

Figure 14:
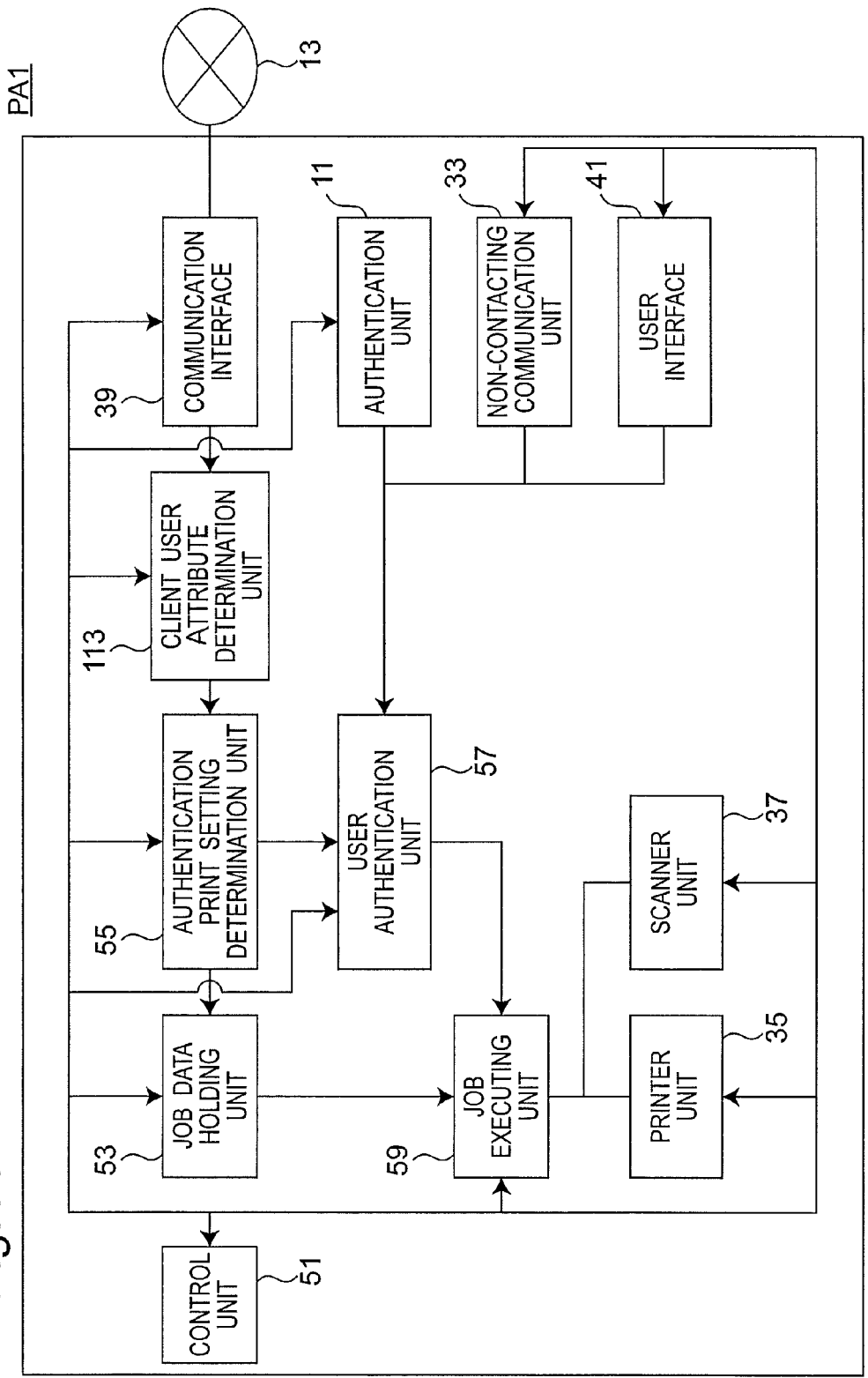
FIG. 14 is a block diagram of a functional configuration of a second modification of the image forming device.

FIG. 14 is a block diagram showing a second modification of the MFP (PA1) of the present embodiment.

In this modification as well, the image forming device sets ON/OFF of the authentication print setting based on a predetermined determination criteria and executes the printout process regardless of the state of the authentication print setting set in the image forming device terminal. In the present modification, the image forming device determines ON/OFF of the authentication print setting and executes the printout process based on the determination even if the image forming device receives job data in which a region (authentication print setting flag) of the parameter indicating the state of the authentication print setting does not exist in the job attribute data of the job data.

<Hardware Configuration of the Image Forming Device>

The hardware configuration of the image forming device is the same as the configuration described with reference to FIG. 2, and thus the description thereof will be omitted.

<Functional Configuration of the Image Forming Device>

FIG. 14 is a block diagram showing a functional configuration of the image forming device (MFP (PA1)) according to the second modification. The present modification differs from the configuration shown in FIG. 3 in that a client user attribute determination unit 113 is arranged.

In the present modification, the job attribute data of the job data normally contains information (transmitter information) of the transmitter who transmitted the job data.

The client user attribute determination unit 113 references the transmitter information, and determines whether the transmitter of the job data is the user belonging to a department (or room) different from the department the MFP (PA1) is installed.

If the client user attribute determination unit 113 determines that the transmitter is the user belonging to another department seen from the MFP (PA1), the MFP (PA1) automatically and forcibly switches the printout process of the job data to the authentication print printout process. On the contrary, if the client user attribute determination unit 113 determines that the transmitter is the user belonging to the same department seen from the MFP (PA1), the MFP (PA1) automatically and forcibly switches the printout process of the job data to the normal printout process.

A method for the client user attribute determination unit 113 of the MFP (PA1) to execute the determination includes a method of making the determination based on a user name indicated by the transmitter information and information related to the department to which the user belongs. In this case, the image forming system 100 preferably has information related to the department to which the user belongs in advance. The information related to the department to which the transmitter belongs may be acquired using an active directory or the LDAP (Lightweight Directory access Protocol) with the user name indicated by the transmitter information as the key. When the transmitter logs into the terminal used in the transmission of the job data, a server that performed authentication of the log is identified, and identification on which department the transmitter belongs is made based on the information related to the department that is under the jurisdiction of the relevant server. For instance, the authentication servers SV2, SV3 (FIG. 1) have jurisdiction over the authentication of the user belonging to department A and department B. If the authentication server that performed the authentication of the login when the transmitter logged into the terminal can be identified, identification on whether the transmitter is the user belonging to department A or the user belonging to department B can be easily made.

The transmitter may be handled as a user belonging to another department if the transmitter information is not contained in the job data or an anonymous transmitter such as "public" is written as the transmitter information. Furthermore, determination may be made based on whether or not the user name described in the transmitter information is user registered to MFP (PA1).

<Image Forming Process Flow>

Figure 15:
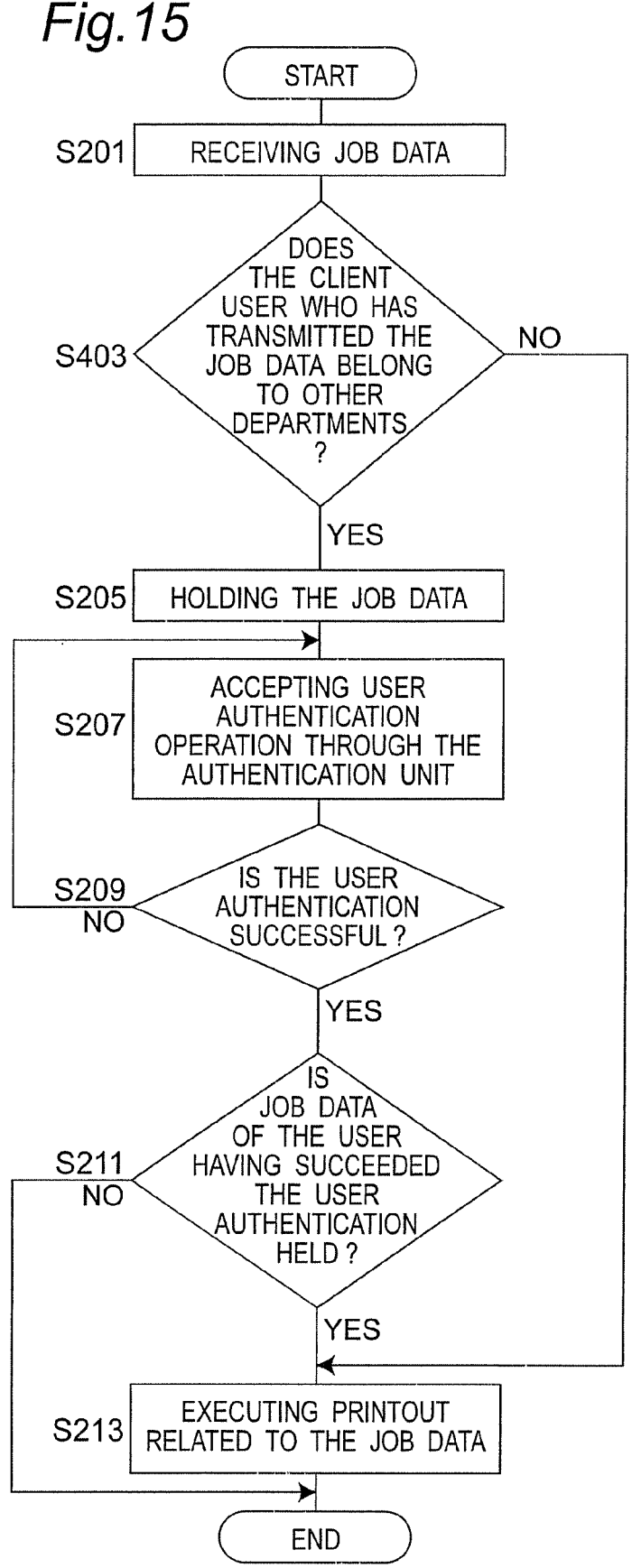
FIG. 15 is a flowchart of a process in the second modification of the image forming device.

FIG. 15 is a flowchart of a flow of process performed by the MFP (PA1). Among the steps in this flowchart, steps including contents same as in the steps of FIG. 10 are denoted with the same reference number. Detailed description on such steps will be omitted.

In step S201, the MFP (PA1) receives the job data sent from an external device.

In step 403, the client user attribute determination unit 113 of the MFP (PA1) references the transmitter information of the job attribute data of the job data, and determines whether or not the transmitter of the job data is the user belonging to another department (or another room) seen from the MFP (PA1). The client user attribute determination unit 113 sets the authentication print setting flag of the job attribute data of the job data to either True/False based on the determination. The client user attribute determination unit 113 sets the authentication print setting flag to "True" if the transmitter is the user belonging to a department different from the MFP (PA1), and on the contrary, the client user attribute determination unit 113 sets the authentication print setting flag to "False" if the transmitter is the user belonging to the same department as the MFP (PA1).

The authentication print setting determination unit 55 references the authentication print setting flag set by the client user attribute determination unit 113 in step S403, and determines whether to execute the printout process related to the relevant job as the authentication print printout process or as the normal printout process.

Subsequent processes are the same as the contents already described, and thus will be omitted.

In the present modification, the image forming device automatically and forcibly determines ON/OFF of the authentication print setting based on the department etc. to which the user who transmitted the job data belongs using the terminal irrespective of the authentication print setting set in the terminal, and executes the printout process. If the user belonging to another department performs the printout using the MFP (PA1), it is not preferable if the printed material output as a result is seen by users belonging to the department in which the MFP (PA1) is installed in terms of information security. In this case, the MFP (PA1) automatically and forcibly turns ON the authentication print setting. Thus, in this modification as well, the image forming device according to the present embodiment succeeds in solving the problems of ensuring information security, and enhancing productivity and improving operability of the image forming device at high level.

<Modification 3>

Figure 16:
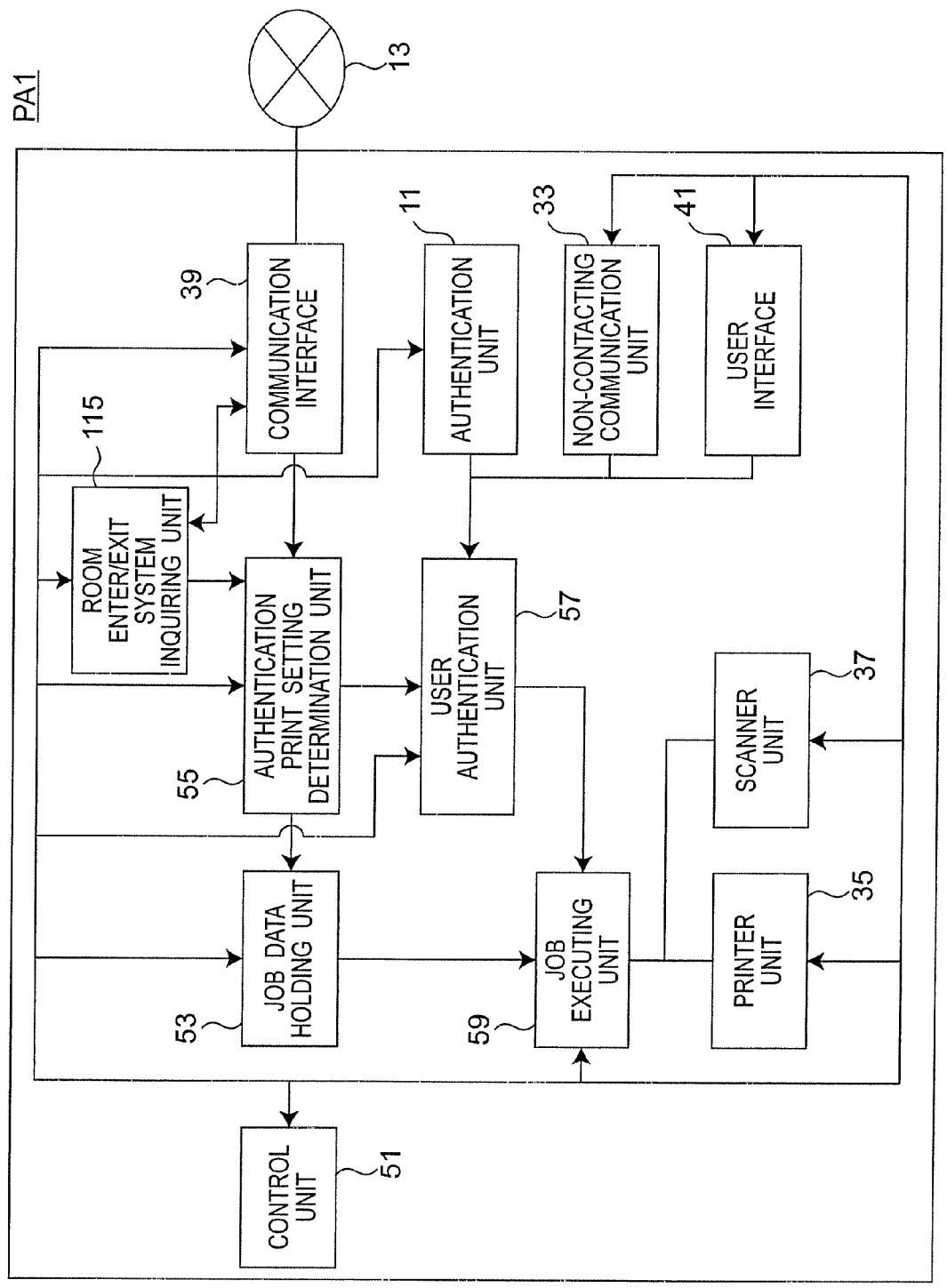
FIG. 16 is a block diagram of a functional configuration of a third modification of the image forming device.

FIG. 16 is a block diagram showing a third modification of the MFP (PA1) of the present embodiment.

In this modification as well, the image forming device sets ON/OFF of the authentication print setting based on a predetermined determination criteria and executes the printout process regardless of the state of the authentication print setting set in the image forming device terminal. In the present modification, the image forming device determines ON/OFF of the authentication print setting and executes the printout process even if a region (authentication print setting flag) of the parameter indicating the state of the authentication print setting is not ensured in the job attribute data of the job data.

<Hardware Configuration of the Image Forming Device>

The hardware configuration of the image forming device is the same as the configuration described with reference to FIG. 2, and thus the description thereof will be omitted.

<Functional Configuration of the Image Forming Device>

FIG. 16 is a block diagram of a functional configuration of the image forming device (MFP (PA1)) according to the second modification. The configuration shown in FIG. 16 and the configuration shown in FIG. 3 differs in that the configuration shown in FIG. 16 includes a room enter/exit system inquiring unit 115.

As shown in FIG. 1, the image forming system 100 may include the room enter/exit management server SV4. The room enter/exit management server SV4 manages the user presence state in each room (A, B) in real time.

The room enter/exit system inquiring unit 115 inquires the user presence state described in the transmitter information of the job attribute data of the job data to the room enter/exit management server SV4. The room enter/exit system inquiring unit 115 receives the result of the inquiry, and determines whether to execute the job as the authentication print printout process or the normal printout process based on the result.

Specifically, if the result of the inquiry indicates that the user or the transmitter is in the same room as the MFP (PA1), the room enter/exit system inquiring unit 115 turns OFF the authentication print setting. The criteria of "present in the same room" may be appropriately changed according to the usage state of the image forming system 100 such as the MFP (PA1). For instance, the user or the transmitter is in the same room as the MFP that instructed the printout. However, if the default printer of the user and the user are currently in separate rooms, the user is assumed to be near the printer that instructed the printout but a great number of users who belong to the department different from the user are assumed to be present near the printer. In such case, the authentication print setting may be turned ON even if the user or the transmitter and the printer are in the same room. Instead of using the unit "room", the position relation of the user and the image forming device may be obtained in units of "floor" to switch ON/OFF the authentication print setting.

<Image Forming Process Flow>

Figure 17:
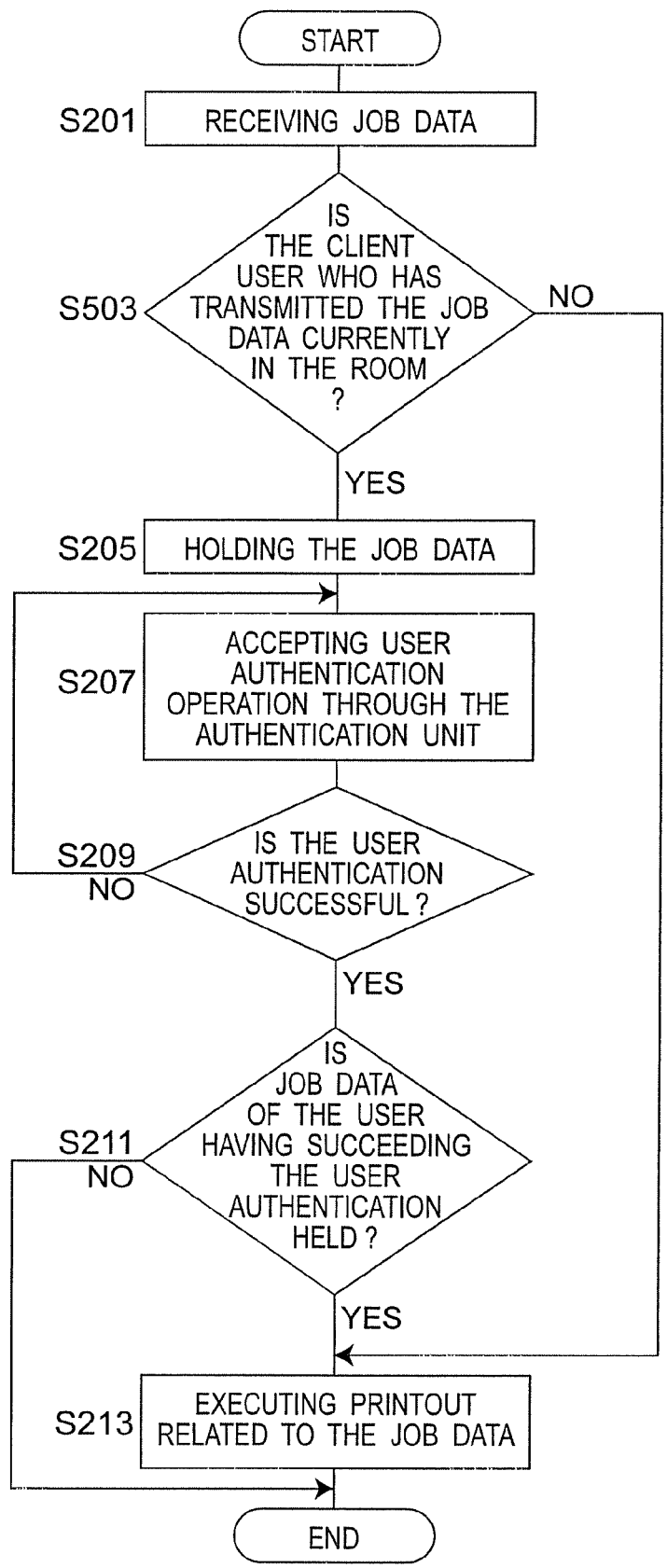
FIG. 17 is a flowchart of a process in the third modification of the image forming device.

FIG. 17 is a flowchart of a flow of process performed by the MFP (PA1). Among the steps in this flowchart, steps including contents same as in the steps of FIG. 10 are denoted with the same reference number. Detailed description on such steps will be omitted.

In step S201, the MFP (PA1) receives the job data sent from an external device.

In step S503, the room enter/exit system inquiring unit 115 of the MFP (PA1) references the transmitter information of the job attribute data of the job data, and determines whether or not the transmitter of the job data is in the same room as the MFP (PA1). The room enter/exit system inquiring unit 115 sets the authentication print setting flag of the job attribute data of the job data to either True/False based on the determination. The room enter/exit system inquiring unit 115 sets the authentication print setting flag to "True" if the user or the transmitter is not in the same room as the MFP (PA1), and on the contrary, the room enter/exit system inquiring unit 115 sets the authentication print setting flag to "False" if the user or the transmitter is in the same room as the MFP (PA1).

The authentication print setting determination unit 55 references the authentication print setting flag set by the room enter/exit system inquiring unit 115 in step S503, and determines whether to execute the printout process related to the job as the authentication print printout process or as the normal printout process.

Subsequent processes are the same as the contents already described, and thus will be omitted.

Therefore, in the present modification, the image forming device automatically and forcibly determines ON/OFF of the authentication print setting based on whether or not the user who transmitted the job data is in the same room as the image forming device in cooperation with the room enter/exit server SV4 irrespective of the authentication print setting set in the terminal, and executes the printout process. Thus, in this modification as well, the image forming device according to the present embodiment succeeds in solving the problems of ensuring information security, and enhancing productivity and improving operability of the image forming device at high level.

The image forming device according to the present invention is an image forming device capable of satisfying both excellent productivity and operability, and reliable ensuring of information security at high level.

What is claimed is:

1. An image forming device terminal for instructing an execution of a printout process on an image forming device capable of executing authentication print printing, which is a printout process of performing user authentication using a predetermined authentication device and determining start of execution of the printout process based on a result of the user authentication; the image forming device terminal comprising:

a selection accepting unit that accepts a selection of an image forming device for executing the printout process from a plurality of image forming devices;

a determination unit that classifies the selected image forming device as a first type image forming device when the selected image forming device is a default set image forming device and classifies the selected image forming device as a second type image forming device when the selected image forming device is not a default set image forming device; and a generating unit that generates job data instructing the printout process to the selected image forming device as a printout process that is not authentication print printing in a case where the selected image forming device is the first type image forming device, and generates job data instructing the printout process to the selected image forming device as a printout process that is authentication print printing in a case where the selected image forming device is the second type image forming device.

2. The image forming device terminal according to claim 1, wherein the determination unit classifies the image forming device as the first type image forming device when the image forming device is set to a normally used printer.

3. A nontransitory computer readable medium storing an image forming device control program executed by a computer of an image forming device terminal for instructing an execution of a printout process on an image forming device capable of executing an authentication print printing, which is a printout process of performing user authentication using a predetermined authentication device and determining start of execution of the printout process based on a result of the user authentication; the program comprising:

code that accepts a selection of an image forming device for executing the printout process from a plurality of image forming devices;

code that classifies the selected image forming device as a first type image forming device when the selected image forming device is a default set image forming device and classifies the selected image forming device as a second type image forming device when the selected image forming device is not a default set image forming device; and code that generates job data instructing the printout process to the selected image forming device as a printout process that is not authentication print printing in a case where the selected image forming device is the first type image forming device, and generates job data instructing the printout process to the selected image forming device as a printout process that is authentication print printing in a case where the selected image forming device is the second type image forming device.

4. The nontransitory computer readable medium according to claim 3, wherein said code that classifies the selected image forming device classifies the image forming device as the first type image forming device when the image forming device is set to a normally used printer.

* * * * *